United States Patent [19]
Paxman et al.

[11] Patent Number: 5,627,363
[45] Date of Patent: May 6, 1997

[54] SYSTEM AND METHOD FOR THREE-DIMENSIONAL IMAGING OF OPAQUE OBJECTS USING FREQUENCY DIVERSITY AND AN OPACITY CONSTRAINT

[75] Inventors: Richard G. Paxman, Ann Arbor; Joseph C. Marron, Brighton, both of Mich.

[73] Assignee: Environmental Research Institute of Michigan, Ann Arbor, Mich.

[21] Appl. No.: 389,718

[22] Filed: Feb. 16, 1995

[51] Int. Cl.$^6$ .................................................. G01B 11/124
[52] U.S. Cl. ............................... 250/208.1; 250/559.03; 250/559.22; 356/376
[58] Field of Search ........................ 250/208.1, 559.22, 250/559.03; 356/376, 377

[56] References Cited

PUBLICATIONS

"Signal Recovery and Synthesis III 1989 Technical Digest Series", vol. 15, paper for Optical Society of America Meeting held Jun. 1989.
"Imaging Correlography With Sparse Arrays of Detectors", J.R. Fienup & Paul S. Idell, Article from Optical Engineering, Sep., 1988, vol. 27 No. 9, pp. 778–784.
"Use of an opacity constraint in three-dimensional imaging", in Inverse Optics III, Proceeding of the SPIE 2241–14, Orlando, Fl (Apr., 1994), by Richard G. Paxman et al.
"Improved bounds on object support from autocorrelation support and application to phase retrieval", T.R. Crimmins et al., Journal of the Optical Society of America, 1990.
"Use of an Opacity Constraint in Three–Dimensional Imaging", R.G. Paxman et al., presented in SPIE conference Apr., 1994.

*Primary Examiner*—Stephone Allen
*Attorney, Agent, or Firm*—Brooks & Kushman P.C.

[57] ABSTRACT

A system and method for creating a three-dimensional image of an opaque object utilize frequency diverse coherent illumination in combination with an opacity constraint in performing three-dimensional phase retrieval and/or profile retrieval. An opaque object is one which exhibits only surface scattering and no volume scattering over volumes that extend beyond the desired range resolution. The system and method require only Fourier intensity information to create a three-dimensional image which avoids the difficulties associated with prior art systems and methods requiring phase information to produce similar images. Furthermore, the system and method of the present invention do not require imaging optics, precise alignment of optical components, or precise phase stability of the coherent illumination source.

25 Claims, 3 Drawing Sheets

SYSTEM AND METHOD FOR THREE-DIMENSIONAL IMAGING OF OPAQUE OBJECTS USING FREQUENCY DIVERSITY AND AN OPACITY CONSTRAINT

TECHNICAL FIELD

The present invention relates to a system and method for three-dimensional imaging of opaque objects with a coherent energy source.

BACKGROUND ART

A myriad of non-contact imaging modalities may be utilized in generating three-dimensional images of opaque objects. Systems such as laser scanners, interferometers, projected pattern analyzers, and the like, are well known in the imaging art.

More recently, Holographic Laser Radar (HLR) has been utilized to produce three-dimensional images as described in detail in U.S. patent application Ser. No. 08/282,781, entitled "System and Method for Three-Dimensional Imaging", filed on Feb. 4, 1994, assigned to the assignee of the present invention. HLR is an interferometric technique that illuminates an object with laser radiation of different frequencies and measures the far-field speckle pattern for each of the illuminating frequencies. Appropriate selection of the laser beam bandwidth provides the desired range resolution for the system. The resulting laser speckle pattern is characterized by in-phase and quadrature measurements which form a three-dimensional Fourier-volume (or aperture) representation of the illuminated object.

The three-dimensional imaging systems described thusfar each have associated disadvantages. For example, laser scanning systems require a cross-range scanner and a precision focusing element which can be expensive. Furthermore, the sequential scanning process requires considerable time which poses a problem in imaging objects having a large cross-range space-bandwidth product, or objects which evolve over the scanning time. Furthermore, the cross-range resolution of the three-dimensional image is limited by the quality and size of the focusing element, which presents a problem particularly in long-range imaging.

Interferometric systems are often used to measure surface profiles of objects but are typically used for specialized applications, such as optical testing. Range ambiguity is often problematic for such interferometric systems. Projection of regular patterns on three-dimensional objects to analyze object deformation or the like, requires an elaborate pattern projection system which is also difficult to use in long-range imaging applications. The HLR sensor is an interferometric sensor which requires measurement of complex fields for the speckle images at various frequencies in order to record the phase relationships both spatially, and among those frequencies. Furthermore, precise alignment of optical components and precise phase stability of both the illumination source and the interferometric component are also required. These requirements are difficult to establish and maintain in long-range imaging applications or imaging in stressing environments, such as when mechanical vibration is present. In addition, aberrating media near the detector plane will cause the phase of the measured field to be aberrated resulting in a corresponding reduction in quality of the three-dimensional image.

DISCLOSURE OF THE INVENTION

Thus, it is an object of the present invention to provide a non-interferometric system and method which require only direct intensity measurements to produce a three-dimensional image of an opaque object rather than complex field (magnitude and phase) measurements.

It is a further object of the present invention to provide a system and method which utilize intensity measurements in conjunction with a phase-retrieval algorithm to produce a three-dimensional image of an opaque object.

An additional object of the present invention is to provide a system and method for three-dimensional imaging utilizing intensity measurements in combination with a profile-retrieval algorithm to estimate the profile, or determine a bound on the profile of an opaque three-dimensional object.

A still further object of the present invention is to provide a system and method for three-dimensional imaging particularly suited for long-range imaging of opaque objects.

Yet another object of the present invention is to provide a system and method which utilize an opacity constraint in combination with a frequency-diverse coherent illumination source and speckle intensity measurements to produce a three-dimensional image of an opaque object.

Still another object of the present invention is to provide a system and method for three-dimensional imaging for use in a variety of applications including three-dimensional inspection of manufacturing parts.

In carrying out the above objects and other objects and features of the present invention, a system is provided including a source of coherent radiation that can be tuned in frequency, a detector array to perform intensity detection of scattered radiation at varying frequencies, a storage medium for storing the series of intensity images, and a computer having logic to implement an algorithm which estimates the object's complex reflectivity using phase retrieval. In another embodiment of the present invention, the computer includes logic to estimate the object profile, or a bound on the object profile, from the stored series of intensity images. An optional display may also be provided for rendering the estimated object.

A method is also provided for three-dimensional imaging of an opaque object. The method includes illuminating the object with coherent radiation at a plurality of frequencies, at each of the plurality of frequencies, detecting and storing intensity information representing radiation scattered from the object, and estimating an image of the object based on the stored intensity information. In one embodiment, estimating an image of the object includes estimating the object's complex reflectivity. In another embodiment, estimating an image of the object includes estimating or bounding the object profile. In either embodiment, the intensity information may be used to produce a rendering of the object. Furthermore, imaging correlography techniques or speckle averaging applied to a plurality of speckle realizations may be employed to estimate an incoherent image and associated rendering of the object.

The advantages accruing to the present invention are numerous. The system and method of the present invention can be utilized for three-dimensional imaging at long ranges which can be problematic for prior art three-dimensional imaging modalities. The system and method of the present invention do not require a reference beam, cross-range scanning, or precise phase stability of the source. Thus, the present invention could be used in the presence of aberrating media and is more tolerant of (or less sensitive to) mechanical vibration. Furthermore, the additional time, hardware, and data storage required to perform field measurements are unnecessary since the system and method of the present invention utilize direct intensity measurements of the scattered radiation. Thus, the present invention reduces hardware complexity at the cost of increased computations which makes it appropriate for a variety of applications.

The above objects and other objects, features, and advantages of the present invention will be readily appreciated by one of ordinary skill in this art from the following detailed description of the best mode for carrying out the invention when taken in connection with the accompanying drawings.

BEST MODE FOR CARRYING OUT THE INVENTION

Figures 1A, 1B:
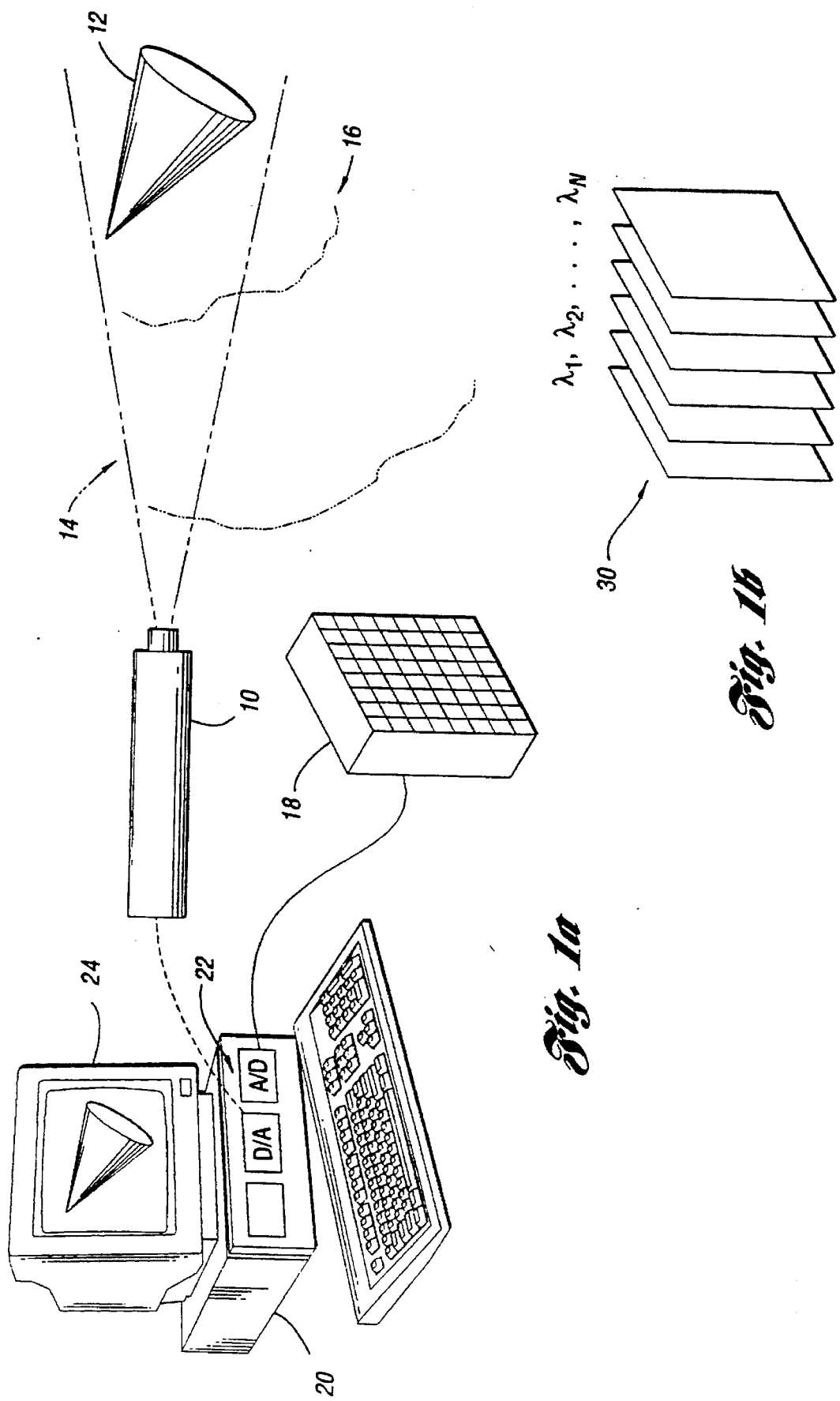
FIG. 1a is a schematic diagram of a system for three-dimensional imaging of opaque objects according to the present invention.
FIG. 1b depicts a collected data set which includes a series of two-dimensional arrays with each representing observed intensity values at a particular illuminating frequency or wavelength.

Referring now to FIG. 1, a schematic diagram of a system for three-dimensional imaging of opaque objects according to the present invention is shown. The system includes a frequency-tunable coherent illumination source 10 for illuminating an opaque object of interest 12. Coherent illumination source 10 transmits an energy beam 14 which is preferably spatially and temporally coherent over the extent of the object. In a preferred embodiment, coherent illumination source 10 is a tunable external cavity diode laser. Thus, as illustrated in FIG. 1, block 10 may include various conventional optical components not specifically illustrated, such as mirrors, beam expanders, polarizers, modulators, and the like to implement an external tunable laser cavity and provide a suitable energy beam. For example, a relatively wide bandwidth illumination source may be combined with a tunable cavity which transmits a single frequency (nominally) to illuminate the object. Similarly, an energy beam utilized according to the present invention need not be an electromagnetic energy beam limited to a particular portion of the spectrum (i.e. optical, UV, RF, etc) but may also include mechanical energy such as an acoustic beam or the like. In fact, any type of coherent illumination source may be utilized without departing from the spirit or scope of the present invention including various other tunable lasers (with internal or external resonator cavities), microwave transmitters, or the like.

Energy beam 14 impinges upon opaque object 12 and is reflected and scattered as represented generally by reference numeral 16. An opaque object is one that exhibits only surface scattering and no volume scattering over volumes that extend beyond the desired range resolution. Thus, only scattering sources that reside on the outer surface of the object contribute to the reflected field. The resulting reflectivity function is thereby confined to a two-dimensional curved surface (which may be discontinuous) embedded in a three-dimensional space.

Reflected energy propagates toward detector array 18 which captures the intensity of the speckle pattern formed thereon and communicates representative signals to a computer 20 via an analog to digital (A/D) interface 22. Preferably, detector array 18 is a charge-coupled device (CCD) two-dimensional array which has its performance parameters (size of array, speed of readout, etc.) selected based on the particular application as described below. Of course, the detector array need not be regular, in the far field, or even in the same plane. For example, a conformal array could alternatively be used. For some applications, such as those requiring imaging of rotating objects, temporal aperture synthesis could also be utilized. Alternative detector strategies utilizing various combinations of real/synthetic arrays, filled/sparse arrays, arrays with/without dispersive elements, and arrays with/without collecting lens(es) may be employed as described herein below.

The most important performance parameters for a three-dimensional sensor, such as illustrated in FIG. 1, include range resolution, unambiguous range, cross-range resolution, cross-range space-bandwidth product, and detector speed. The intrinsic range resolution is given by:

$$\delta_z = \frac{c}{2\Delta v_{full}} \qquad (1)$$

where c represents the speed of light and $\Delta v_{full}$ is the gain bandwidth of the tunable coherent illumination source. In a preferred embodiment of the present invention utilizing a diode laser, the gain bandwidth is approximately 7.4 THz giving an intrinsic resolution of 20 μm. The range resolution, $\delta_z$ denotes the width of the impulse response function in the range dimension. Because the object surface is opaque, the peak of the impulse response function may be located with finer precision than the intrinsic width. Thus, for this preferred embodiment, resolutions on the order of 5 μm or less may be attainable.

The unambiguous range is determined by:

$$z_{unamb} = \frac{c}{2\Delta v_{samp}} \qquad (2)$$

where $\Delta v_{samp}$ is the coherent illumination frequency sampling interval. The sampling interval and the full-gain bandwidth are related by:

$$\Delta v_{full} = N_z \Delta v_{samp} \qquad (3)$$

where $N_z$ is the number of frequency samples recorded in the data set. Therefore, the unambiguous range trades directly with the amount of data collected. For example, if $N_z=64$, the unambiguous range will be 1.3 mm. If more unambiguous range is desired while maintaining the range resolution, more data is required. Thus, data collection can be adjusted depending upon the requirements of the particular application.

The cross-range resolution of a three-dimensional sensor according to the present invention is given by:

$$\delta_x = \delta_y = \frac{R\bar{\lambda}}{D_{det}} \quad (4)$$

where R is the range from the object to the detector, $\bar{\lambda}$ is the mean source wavelength, and $D_{det}$ is the width of the detector array, assumed to be the same in both the x and y directions. In a preferred embodiment, a 512×512 CCD array serves as the detector with an element size of 16 µm which provides a value for $D_{det}$=8.2 mm. If the range from the object is about 1 m and the mean source wavelength is about 0.78 µm (which corresponds to one of the number of available tunable diode lasers), then the cross-range resolution is approximately equal to 0.1 mm ($\delta_x \approx 0.1$ mm). If a coarser resolution is desired or acceptable, the range from the object to the detector array may be extended.

The cross-range space-bandwidth product is given directly by the number of elements in the CCD array. Thus, in the preferred embodiment referenced above, the cross-range space-bandwidth product is $512^2$ or 262,144.

The speed of data collection for the preferred embodiment is limited by the readout rate of the CCD array of the sensor. CCD arrays with data readouts equal to video frame rates (30 frames per second) allow 64 frequency samples to be collected in just over two seconds. Once the data are collected, the processing speed depends upon the particular computer and the particular logic used to implement the phase and/or profile-retrieval algorithms. With currently available algorithms, processing the collected data to produce an image and subsequent rendering requires a longer period of time than that required for data collection.

In a preferred embodiment, computer 20 is a dedicated SUN work station which executes appropriate logic to control the data-collection sequence and perform object phase retrieval and/or object profile retrieval. Of course, any general purpose programmable computer, dedicated digital processing circuitry, or combination thereof may be used to perform object phase retrieval and/or object profile retrieval to generate an estimate or bound for the object. Collected data may also be used to produce a three-dimensional rendering of the object.

Computer 20 may include any of a number of conventional components such as a monitor or video display 24 for displaying a rendering of the object based on the collected data, volatile and non-volatile memory, a processor, a keyboard, and the like (not specifically illustrated). Of course, an additional high-resolution video display (not specifically shown) may also be connected to computer 20 in addition to monitor 24. Computer 20 may also communicate with tunable coherent illumination source 10 to select and/or control the frequency of the source as explained in greater detail below.

FIG. 1b depicts a typical data set 30 which is collected by detector array 18 and stored in computer 20. Data set 30 includes a series of two-dimensional data arrays with each data array corresponding to a particular illumination frequency or wavelength. Each array element corresponds to a relative intensity reading collected from an associated element in detector array 18. It can be shown that each data array is a "slice" of the three-dimensional Fourier intensity of the object by applying the concepts discussed in "Three-dimensional lensless imaging using laser frequency diversty" by J. C. Marron and K. S. Schroeder, *Applied Optics*, Vol. 31, pp. 255–262 (1992), the disclosure of which is hereby incorporated by reference in its entirety. As such, data set 30 represents the squared magnitude (or intensity) of the three-dimensional Fourier transform of the object over a three-dimensional Fourier volume or aperture.

In operation, the goal is to acquire a separate speckle image for each of several illuminating frequencies. Thus, computer 20 controls tunable coherent source 10 to illuminate object 12 at a plurality of frequencies either in sequence (serially) or simultaneously (in parallel) as explained below. Reflected energy propagates to detector array 18 which converts the intensity of the speckle pattern at each frequency to an electrical signal (or equivalent representation) communicated to computer 20. A/D interface 22 digitizes the intensity data which is then stored in computer 20 or on a non-volatile storage medium for future processing. Computer 20 then executes appropriate logic to perform phase retrieval to estimate the object complex reflectivity.

A more rigorous mathematical treatment of the concepts employed by the present invention and results of a computer simulation may be found in "Use of an opacity constraint in three-dimensional imaging", Inverse Optics III, *Proceedings of the SPIE* 2241-14, (April, 1994) by Richard G. Paxman, John H. Seldin, James R. Fienup, and Joseph C. Marron, the disclosure of which is hereby incorporated by reference in its entirety.

In many applications it is sufficient to retrieve the surface profile of the opaque object without retrieving the complex reflectivity on the surface. In these instances it may be possible to perform profile retrieval using an opacity constraint with or without performing phase retrieval. Other constraints may also be used, such as support bounds on the object (which may be derived from the support of the autocorrelation), to perform phase or profile retrieval. As is known, supports provide limits or bounds on the estimates of the reconstructed image. Thus, the image can be determined more quickly if higher quality or tighter supports can be brought to bear to reduce the number of possible image estimates. The determination of object support bounds from autocorrelation support for use in phase retrieval is discussed by T. R. Crimmins, J. R. Fienup, and B. J. Thelen in "Improved bounds on object support from autocorrelation support and application to phase retrieval", published in Vol. 7, No. 1 of the *Journal of the Optical Society of America*, (January, 1990), the disclosure of which is hereby incorporated by reference in its entirety.

For some applications it is desirable to reduce the speckle in the reconstruction of the complex reflectivity in order to create an incoherent rendering of the object. This is accomplished by any of a variety of speckle-reduction algorithms which may include collecting additional data sets corresponding to different speckle realizations and averaging the intensities of the reconstructed objects.

Alternatively, imaging correlography methods may be performed which use measurements of the intensity of speckle patterns formed by radiation reflected from a coherently illuminated object to calculate an estimate of the energy (or power) spectrum of the underlying incoherent object without requiring a phased array. These techniques are based on the fact that the autocorrelation function of an illuminated object's brightness distribution can be obtained from the average energy spectrum of a laser speckle pattern where the brightness distribution is essentially the irradiance distribution had the object been illuminated with an incoherent source. An unspeckled image can then be recovered from an estimate of the energy spectrum of the brightness distribution through phase retrieval. A more detailed explanation and analysis is provided by J. R. Fienup and Paul S. Idell in "Imaging correlography with sparse arrays of detectors", *Optical Engineering*, Vol. 27, No. 9 (September, 1988), the disclosure of which is hereby incorporated by reference in its entirety.

Figure 2:
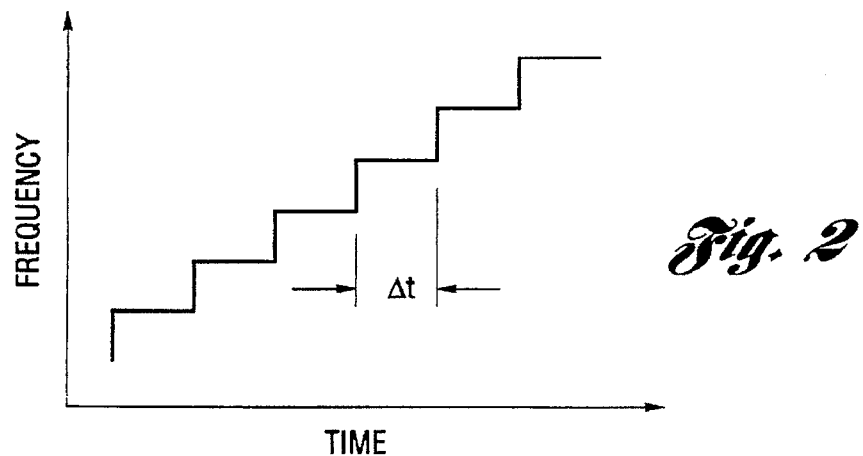
FIG. 2 is a graph illustrating a step-frequency illumination pulse used in the system for three-dimensional imaging of opaque objects according to the present invention during serial frequency illumination.

One method to implement serial frequency illumination is to modulate the output frequency of coherent illumination source 10 with an acousto-optic (AO) device to serially step through a sequence of desired frequencies. The graph of FIG. 2 illustrates a representative serial frequency illumination strategy plotting frequency as a function of time. The duration of each frequency step must be such that the intensity of the speckle pattern may be detected and stored by detector array 18 and computer 20, respectively, before changing to the next subsequent frequency.

Another illumination method of the present invention employs parallel frequency illumination, in which an alternative illumination waveform is utilized rather than a stepped frequency waveform. In parallel frequency illumination, the object is illuminated with multiple frequencies simultaneously. A number of means may be utilized to produce a multiple frequency illumination beam. For example, a short pulse (temporally) or a chirped pulse may be utilized. Alternatively, if a laser source is used, it may be operated such that a number of longitudinal modes exist simultaneously so as to provide a relatively wide bandwidth illumination beam. Parallel frequency illumination, whether used with a synthetic aperture array or a filled array, requires dispersive elements (best illustrated in FIG. 4) to separate the various frequencies. Although it requires less time to capture the data set than serial frequency illumination, parallel frequency illumination compels the use of additional optical components with exacting requirements.

Figure 3:
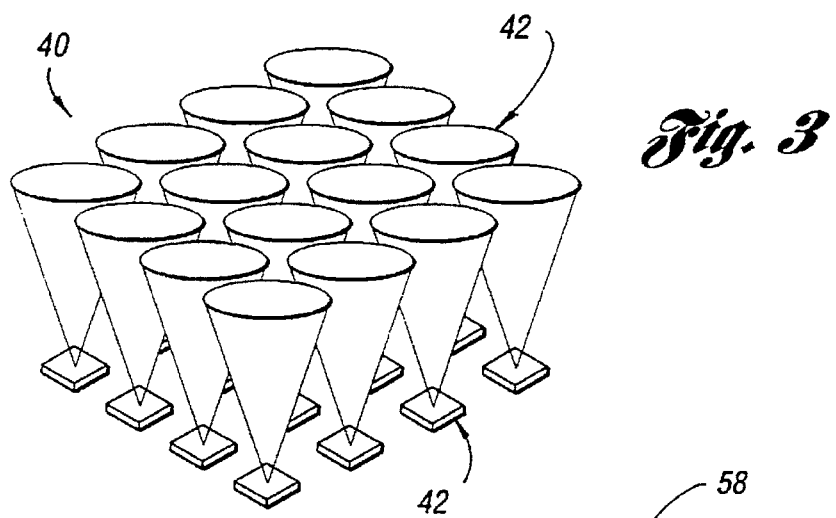
FIG. 3 is a schematic illustration of a detection strategy using serial frequency illumination and a filled-aperture array implemented with an array of collecting lenses in a system for three-dimensional imaging of opaque objects according to the present invention.

Referring now to FIG. 3, an alternative detector strategy is illustrated for use with a system for three-dimensional imaging of opaque objects, such as the system illustrated in FIG. 1. Detector array 40 is a filled-aperture array which utilizes a collecting lens, such as lens 42, for each detector element 44. These collecting lenses need not be precision optical elements. The energy reflected from an object (as illustrated and described with reference to FIG. 1) is directed by each collecting lens 42 onto a corresponding detector element 44. Each detector element creates an electrical signal which is proportional to the intensity of the detected radiation and communicates this signal to a computer for storage and processing. This type of detector array is particularly suited to long-range imaging applications where large pupils are required to achieve appropriate resolution and where weak signals are prevalent.

Figure 4:
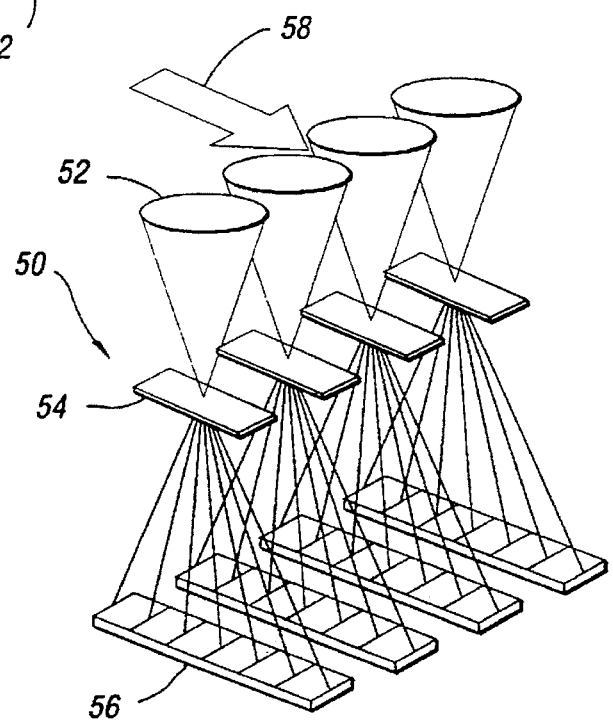
FIG. 4 is a schematic illustration of another alternative detection strategy using parallel frequency illumination and a synthetic aperture array in a system for three-dimensional imaging of opaque objects according to the present invention.

Another alternative detector strategy is illustrated in FIG. 4 for use with a system for three-dimensional imaging of opaque objects according to the present invention. Detector 50 includes an array of collecting lenses such as lens 52, dispersive elements such as element 54, and detector arrays such as array 56. As illustrated, detector 50 may be used to form a sparse synthetic-aperture array which is particularly suited for parallel frequency illumination of a moving opaque object. Of course, detector 50, or detector 40 could be implemented in various configurations characterized as sparse/filled, real/synthetic, dispersive/non-dispersive, and with/without collecting lenses as noted above. Thus, detectors 40 and 50 of FIGS. 3 and 4, respectively, illustrate only two of the many possible configurations available.

As an example for a detector constructed as illustrated in FIG. 4, consider an opaque object moving with some overhead trajectory, such as a missile or space object, illuminated with a coherent radiative energy beam. Energy will be reflected to form a speckle pattern on the ground having a diameter determined by:

$$\rho = \frac{R\lambda}{D_{obj}} \quad (5)$$

where $\rho$ represents the speckle diameter, R is the object range, $\lambda$ is the wavelength of the illuminating radiation, and $D_{obj}$ is the object diameter in the cross-range direction. To detect this speckle pattern with a synthetic aperture sensor, the maximum spacing of detector elements necessary to satisfy the Nyquist criterion is determined by:

$$\Delta x = \frac{\rho}{2} \quad (6)$$

or, substituting for $\rho$:

$$\Delta x = \frac{R\lambda}{2D_{obj}} \quad (7)$$

Thus, for an object having a diameter in the cross-range direction of 5 m at a range of 100 km using an illumination source having a wavelength of 1 µm, the spatial sampling interval required is $\Delta x \leq 1$ cm.

A synthetic-aperture design is particularly useful for applications in which the opaque object is rotating which results in a translating speckle pattern on the ground. The speckle will translate on the ground at a speed determined by:

$$v_s = 2R\omega \quad (8)$$

where $\omega$ represents the angular velocity of the opaque object and R is the object range. If a linear array of detectors is oriented perpendicular to the direction of speckle translation as indicated by arrow 58 of FIG. 4, a cross-range speckle pattern can be built up synthetically in time. This results in a significant reduction in hardware requirements over a comparable filled array as illustrated in FIG. 3.

For a serial frequency illumination strategy using a synthetic-aperture design, a step-frequency illumination source such as graphically depicted in FIG. 2 may be used. In this case, the duration of a frequency step, $\Delta t$, must be long enough so that returns from near and far points on the opaque object can simultaneously have the same frequency so:

$$\Delta t > \frac{2Z_{obj}}{c} \quad (9)$$

where $Z_{obj}$ represents the depth of the object and c represents the speed of light. As a result, each step-frequency sequence requires a collection time determined by:

$$T = N\Delta t \quad (10)$$

where N is the number of individual illuminating frequencies (or number of range bins) desired in the three-dimensional image.

To satisfy the Nyquist criterion in creating this temporal synthetic aperture for each of the illuminating frequencies, a speckle must move no more than a half of a speckle diameter during an entire step-frequency sequence so that:

$$v_s < \frac{\rho}{2N\Delta t} \quad (11)$$

This results in a limit on the angular velocity of the opaque object which is independent of range and determined by:

$$\omega < \frac{\lambda_c}{8ND_{obj}Z_{obj}} \quad (12)$$

In a typical application where $D_{obj}=5$ m, $Z_{obj}=2$ m, $N=10$, and $\lambda=1$ µm, the maximum angular velocity would be $\omega<0.375$ radians per second. This limit is not particularly restrictive such that serial frequency illumination with a synthetic aperture provides for imaging of numerous objects. For an object rotating faster than the limit determined using the Nyquist criterion, the image will be undersampled resulting in aliasing in one cross-range dimension.

As with a filled-aperture system, parallel frequency illumination may be utilized with a synthetic aperture such as that illustrated in FIG. 4. This is desirable for many applications since it is not necessary to precisely time the frequency of the illumination source with the data collection from the sensor. However, as noted above, the resolving power needed to differentiate between frequencies with a dispersive element, such as dispersive element 54, is rather demanding. To meet the Nyquist criterion, the frequency interval is determined by:

$$\Delta v \leq \frac{c}{2Z_{obj}} . \tag{13}$$

Each dispersive element should have a resolving power defined as:

$$R_p \equiv \frac{\bar{\lambda}}{\Delta \lambda} \tag{14}$$

or $$R_p \approx \frac{\bar{v}}{\Delta v} , \tag{15}$$

where $\bar{\lambda}$ and $\bar{v}$ represent the center wavelength and frequency, respectively. Substituting in the expression for the maximum frequency interval provides:

$$R_p \geq \frac{2Z_{obj}\bar{v}}{c} \tag{16}$$

or $$R_p \geq \frac{2Z_{obj}}{\bar{\lambda}} . \tag{17}$$

Figure 5:
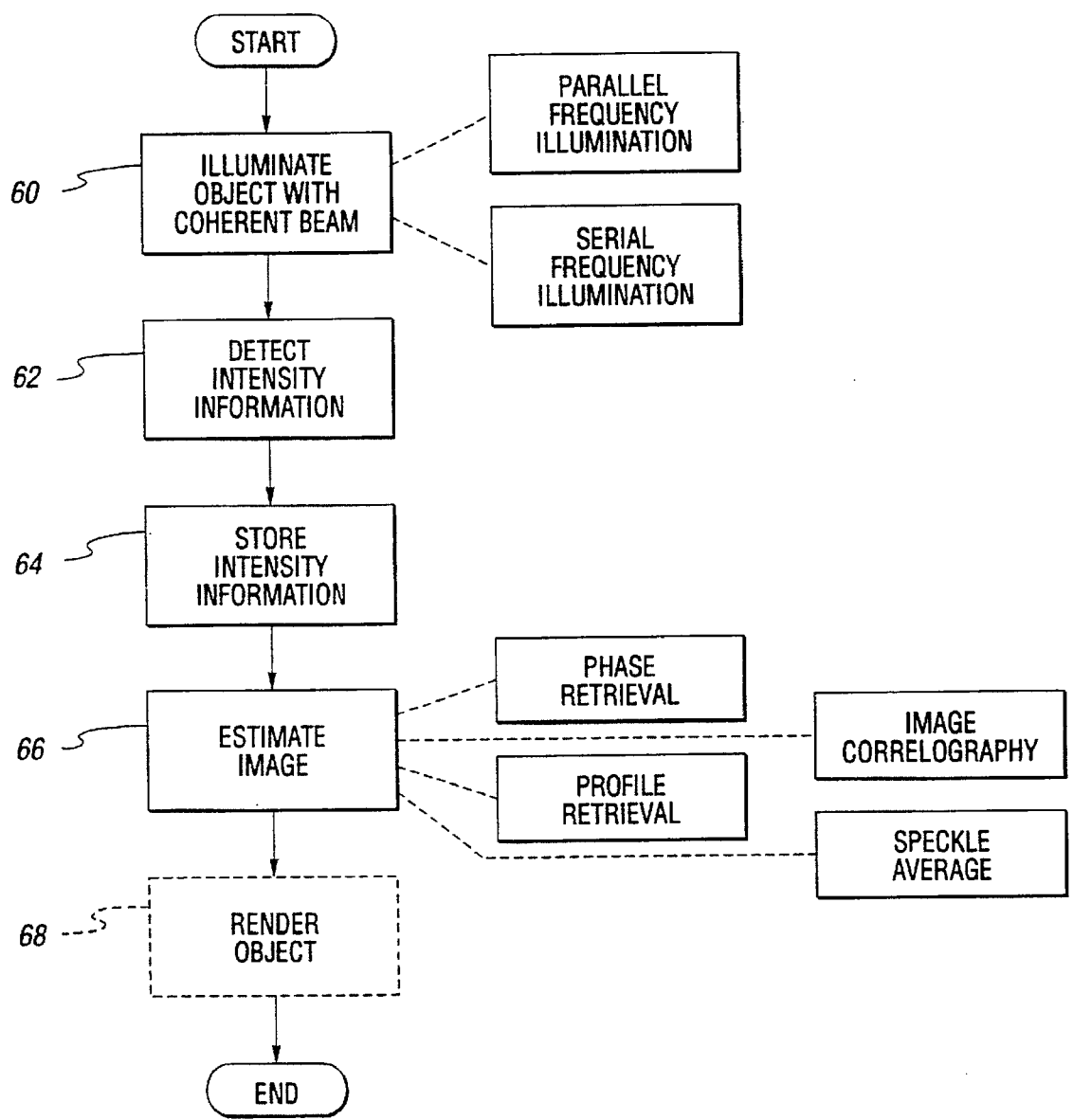
FIG. 5 is a flow chart illustrating steps in a method for three-dimensional imaging of opaque objects according to the present invention.

Referring now to FIG. 5, a flow chart is shown illustrating a method for three-dimensional imaging of opaque objects according to the present invention. Step 60 includes illuminating the object with a coherent radiative beam at a plurality of frequencies. As described above, this step may utilize serial frequency illumination or parallel frequency illumination. Step 62 includes detecting intensity information representing radiation scattered from the object for each of the plurality of frequencies. Step 64 includes storing the intensity information or a representation thereof for future processing.

As also shown in FIG. 5, step 66 includes estimating an image of the object based on the stored intensity information (or representation). Estimating an image of the object may include estimating the complex reflectivity using a phase-retrieval algorithm. Alternatively, or in addition thereto, estimating an image of the object may include estimating the object profile or a bound on the object profile. As described above, when performing profile retrieval or phase retrieval, the present invention utilizes an opacity constraint, i.e. the prior knowledge that the object to be imaged is opaque, to reduce the number of possible estimates. Other object constraints may also be used, such as support of the object, possibly derived from the support of the autocorrelation.

As also illustrated in FIG. 5, step 66 may include performing imaging correlography or speckle averaging to produce an estimate of the image. Optional step 68 then utilizes the stored intensity information and/or the estimated image to produce a three-dimensional rendering of the object.

The present invention may be utilized in a wide variety of three-dimensional imaging applications which range from the inspection of manufacturing parts, to imaging of missiles or space objects.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A system for determining an image of an opaque object, the system comprising:

a source of coherent radiation for illuminating the opaque object at a plurality of frequencies to create a corresponding plurality of speckle patterns;

a detector for performing intensity detection of scattered radiation forming the speckle patterns at each of the plurality of frequencies;

a computer in communication with the detector for storing a representation of the detected intensities and executing logic to determine an estimate of the object based on the stored representation and knowledge that the object is opaque such that the representation is confined to a two-dimensional surface embedded in a three-dimensional space.

2. The system of claim 1 wherein the detector comprises collecting optics for collecting the scattered radiation and directing the scattered radiation toward at least one detector element.

3. The system of claim 1 further comprising:

a display connected to the computer for displaying a rendering of the opaque object.

4. The system of claim 1 wherein the detector comprises an array of charge-coupled devices for directly detecting the scattered radiation.

5. The system of claim 1 wherein the detector comprises a filled array.

6. The system of claim 1 wherein the detector comprises a synthetic-aperture array.

7. The system of claim 1 wherein the source of coherent radiation comprises a tunable laser.

8. The system of claim 1 wherein the source of coherent radiation comprises an acousto-optic modulator.

9. The system of claim 1 wherein the computer is also connected to the source of coherent radiation and wherein the computer controls the frequency of the source of coherent radiation.

10. The system of claim 1 wherein the computer further includes logic rules to implement a phase-retrieval algorithm to determine the complex reflectivity of the object.

11. The system of claim 1 wherein the computer further includes logic rules to implement a profile-retrieval algorithm.

12. The system of claim 1 wherein the source of coherent radiation comprises a microwave transmitter.

13. The system of claim 1 wherein the detector comprises a conformal array.

14. A method for determining a three-dimensional image of an opaque object, the method comprising:

illuminating the opaque object with coherent radiation at a plurality of frequencies;

at each of the plurality of frequencies, detecting intensity information representing radiation scattered from the object forming a corresponding plurality of speckle patterns;

storing the detected intensity information; and estimating an image of the opaque object based on the stored intensity information and knowledge that the object is opaque such that the intensity information is confined to a two-dimensional surface embedded in a three-dimensional space.

15. The method of claim 14 wherein estimating an image comprises estimating complex reflectivity of the opaque object.

16. The method of claim 15 wherein estimating the complex reflectivity comprises performing three-dimensional phase retrieval.

17. The method of claim 14 wherein estimating an image comprises estimating a profile of the opaque object.

18. The method of claim 14 wherein estimating an image comprises estimating a profile of the opaque object utilizing object autocorrelation information derived from the stored intensity information.

19. The method of claim 14 wherein estimating an image comprises determining a bound for a profile of the opaque object.

20. The method of claim 14 further comprising determining a three-dimensional rendering of the object based on the stored intensity information.

21. The method of claim 14 wherein estimating an image comprises estimating an incoherent image of the opaque object.

22. The method of claim 14 wherein estimating an image comprises performing speckle averaging.

23. The method of claim 14 wherein estimating an image comprises performing imaging correlography.

24. The method of claim 14 wherein illuminating the object with coherent radiation comprises simultaneously illuminating the object at more than one of the plurality of frequencies.

25. The method of claim 14 wherein illuminating the object with coherent radiation comprises sequentially illuminating the object at each of the plurality of frequencies.

* * * * *